US008849781B2

(12) United States Patent
Bradford et al.

(10) Patent No.: US 8,849,781 B2
(45) Date of Patent: Sep. 30, 2014

(54) ADAPTIVE SOFTWARE COMPONENT TECHNIQUES

(75) Inventors: Lindsay Bradford, St. Lucia (AU);
Stephen Milliner, Holland Park (AU);
Julien J. P. Vayssiere, Red Hill (AU)

(73) Assignee: SAP AG, Walldorf (DE)

( * ) Notice: Subject to any disclaimer, the term of this patent is extended or adjusted under 35 U.S.C. 154(b) by 1631 days.

(21) Appl. No.: 11/097,679

(22) Filed: Mar. 31, 2005

(65) Prior Publication Data

US 2006/0129516 A1 Jun. 15, 2006

Related U.S. Application Data

(60) Provisional application No. 60/635,855, filed on Dec. 13, 2004.

(51) Int. Cl.
*G06F 17/30* (2006.01)
*H04L 29/08* (2006.01)
*G06F 9/445* (2006.01)

(52) U.S. Cl.
CPC *G06F 8/65* (2013.01); *H04L 67/02* (2013.01); *H04L 67/34* (2013.01)
USPC .......................................................... 707/705

(58) Field of Classification Search
CPC ...................................................... G06F 17/30
See application file for complete search history.

(56) References Cited

U.S. PATENT DOCUMENTS

| 6,006,034 A | 12/1999 | Heath et al. | |
|---|---|---|---|
| 6,757,710 B2 * | 6/2004 | Reed | 709/203 |
| 2002/0112033 A1 * | 8/2002 | Doemling et al. | 709/219 |
| 2003/0227487 A1 * | 12/2003 | Hugh | 345/777 |
| 2004/0044999 A1 | 3/2004 | Gibson | |

OTHER PUBLICATIONS

Abdelzaher, Tarek F., et al., "Web Server QoS Management by Adaptive Content Delivery", *International Workshop on Quality of Service*, (Jun. 1999),1-10.
Amir, Elan , et al., "An Active Service Framework and its Application to Real-time Multimedia Transcoding", *Proceedings of the ACM SIGCOMM Conference on Applications, Technologies, Architectures, and Protocols for Computer Communication*, (Sep. 1998),1-12.
Bhatti, Nina , et al., "Integrating User-Perceived Quality into Web Server Design", *Proceedings of the 9th International World-Wide Web Conference*, (May 2000),1-16.
Bouch, Anna , et al., "Quality is in the Eye if the Beholder: Meeting Users' Requirements for Internet quality Service", *The Future is Here CHI Letter*, 2(1), (2000),297-304.
Bradford, Lindsay , et al., "Scaling Dynamic Web Content Provision Using Elapsed-Time-Based Content Degradation", *Web Information Systems, WISE 2004: 5th International Conference on Web Information Systems Engineering*, Brisbane, Australia, Proceedings, (Nov. 22-24, 2004),13 Pages.

(Continued)

*Primary Examiner* — Hosain Alam
*Assistant Examiner* — Johnese Johnson
(74) *Attorney, Agent, or Firm* — Schwegman Lundberg & Woessner, P.A.

(57) ABSTRACT

Techniques are presented for dynamically adapting software components. An enhancement for a component is dynamically detected and installed. The enhancement is dynamically processed for requests directed to the component or for responses generated by the component.

19 Claims, 4 Drawing Sheets

(56) References Cited

OTHER PUBLICATIONS

Chandra, Surendar, et al., "Differentiated Multimedia Web Services Using Quality Aware Transcoding", INFOCOM—Nineteenth Annual Joint Conference of The IEEE Computer and Communications Societies (Mar. 2000),961-969.

Chen, Huamin, et al., "A Tiered System for Serving Differentiated Content", World Wide Web: Internet and Web Information Systems, 6, (2003),331-352.

Chen, Xuan, et al., "Flash Crowd Mitigation va Adaptive Admission Control based on Application-level Observations", Technical Report ISI-TR-557, USC/Information Sciences Institute, (May 2002),1-15.

Colajanni, Michele, et al., "System architectures for Web content adaptation services", *IEEE Distributed Systems Online*, http://dsonline.computer.org/portal/site/dsonline/menuitem.9ed3d9924aeb0dcd8 2ccc6716bbe36ec/index.jsp?&pName=dso_level1&path=dsonline/topics/was&file=adaptation.xml&xsl=article.xsl&,(2005),Web Page.

Doberkat, E E., et al., "JavaSpaces: Principles, Patterns and Practice", *Softwaretechnik-Trends*, 20(4), Book Review,(Nov. 2000),1-2.

Fielding, R, et al., "Hypertext Transfer Protocol—HTTP/1.1", ftp://ftp.isi.edu/in-notes/rfc2616.txt, (Jun. 1999),1-196.

Floyd, Sally, "Link-sharing and Resouce Management Models for Packet Networks", *IEEE/ACM Transactions of Networking*, 3(4), (Aug. 1995),365-386.

Garlan, David, "Software Architecture: a Roadmap", *Proceedings of the Conference on The Future of Software Engineering*, (2000),91-101

Gelernter, David, "Generative Communications in Linda", *ACM Transactions on Programming Languages and Systems*, 7(1), (1985),80-112.

Gribble, Steven D., et al., "The Ninja Architecture for Robust Internet-Scale Systems and Services", *The University of California at Berkeley*, 18 Pages.

Kroeger, Thomas M., et al., "Exploring the bounds of Web Latency Reduction from Caching and Prefetching", *Proceedings of the USENIX Symposium on Internet Technologies and Systems*, (1997), 11 Pages.

Miller, R, "Response Time in Man-Computer Conversational Transactions", *Proc. AFIPS Fall Joint Computer Conference*, vol. 33, (1968),267-277.

Mosberger, David, et al., "httperf—a tool for measuring web server performance", *ACM SIGMETRICS Performance Evaluation Review*, 26(3), (Dec. 1998),31-37.

Ramsay, Judith, et al., "A psychological investigation of long retrieval time on the World Wide Web", *Interacting with Computers 10*, (1998),77-86.

Reddy, Raj, et al., "A Model and a System for Machine Recognition of Speech", *IEEE Transactions on Audio and Electroacoustics*, vol. Au-21, No. 3, (1973),229-238.

Shaw, Mary, et al., "Software architecture : pespectives on a emerging discipline", *Upper Saddle River, N.J. : Prentice Hall*, (1996),2. 3-2.8 and 5.1-5.2.

Shi, Weisong, et al., "Modeling Object Characteristics of Dynamic Web Content", *Department of Computer Science Courant Institute of Mathematical Sciences*, Technical Report: TR2001-822,1-18.

Wegner, Peter, "Interactive foundations of computing", *Theoretical Computer Science*, 192, (1998),315-351.

Welsh, Matt, et al., "A Design Framework for Highly Concurrent Systems", *UC Berkeley Technical Report UCB/CSD-00-1108*, (Apr. 2000), 14 Pages.

Welsh, Matt, et al., "Adaptive Overload Control for Bus Internet Servers", *Proceedings of the 4th USENIX Conference on Internet Technologies and Systems (USITS)*, (Mar. 2003),32 Pages.

Williams, Lloyd G., et al., "PASAsm: A Method for the Performance Assessment of Software Architectures", *Software Engineering Research and Performance Engineering Services*, (2002),1-13.

European Search Report for application No. 05027164.2.-2413, (Jul. 2, 2006), 3 pgs.

Apache Software Foundation, "The Apache Jakarta Project", http://jakarta.apache.org/tomcat/index, (Copyright 1999-2005), 4 pgs.

\* cited by examiner

ADAPTIVE SOFTWARE COMPONENT TECHNIQUES

RELATED APPLICATIONS

This application claims the priority benefit of U.S. Provisional Application No. 60/635,855, entitled: "Adaptive HTTP Server Using Active Object Space," filed Dec. 13, 2004, which is incorporated by reference herein.

FIELD OF THE INVENTION

The invention relates generally to server software in a networked environment and more particularly to the dynamic adaptive software components processed on a server.

BACKGROUND OF THE INVENTION

Client/server software applications have come under growing pressure to change in order to meet evolving requirements and alterations within the environments in which they are deployed. It is desirable that these applications exhibit maximum performance under stressful and even unforeseen circumstances. Simply trying, at design time, to predict what adaptation may be required at run time (e.g., a Just in Case (JIC) approach), is often not enough since this cannot anticipate all run-time situations that actually require adaptation at run time.

Furthermore, attempting to build adaptability into an application before it is deployed requires unusual clairvoyance on the part of software developers, since the developers need to understand what parts of the application will have to be adapted and to what degree during the design phase. Even the most well-thought and anticipated design will often require some degree of specific tailoring to fit circumstances once the impact upon the application becomes known for those circumstances.

One adaptability concern relates to an application's scalability or performance. That is, an application's usage or commercial success may initially be underestimated. Consequently, the application may need to be scaled upward to meet the unexpected demand. A popular approach to this problem is to over-provision computing resources (e.g., processors and/or memory), typically by supplying duplicate machines that share application requests through some load balancer mechanism. This solution is not only costly, but also requires increased configuration and administration.

Another approach to application scalability is to deploy caching services. With caching services frequently accessed application data is maintained in memory for improved access response times. This approach requires maintenance and support of caching policies and requires maintaining additional hardware associated with memory devices that support caching.

In general, application adaptability has been primarily concerned with techniques that attempt to stretch limited resources (e.g., processor and memory) farther than they would otherwise have extended when a particular application or component becomes popular beyond initial expectations. These approaches have not focused on altering the behavior of the application, but have rather sought to improve the environment and external interfaces associated with the application.

Therefore, there is a need for improved application or software component adaptability techniques, which dynamically extend or alter a component's behavior for purposes of acquiring a desired adaptation.

SUMMARY OF THE INVENTION

According to an embodiment, an active object space (AOS) environment is provided where enhancements to components are dynamically recognized, installed, and processed. The enhancements may be achieved by dynamically replacing individual component behaviors that in turn alter behaviors of the overall service.

DETAILED DESCRIPTION

Figure 1:
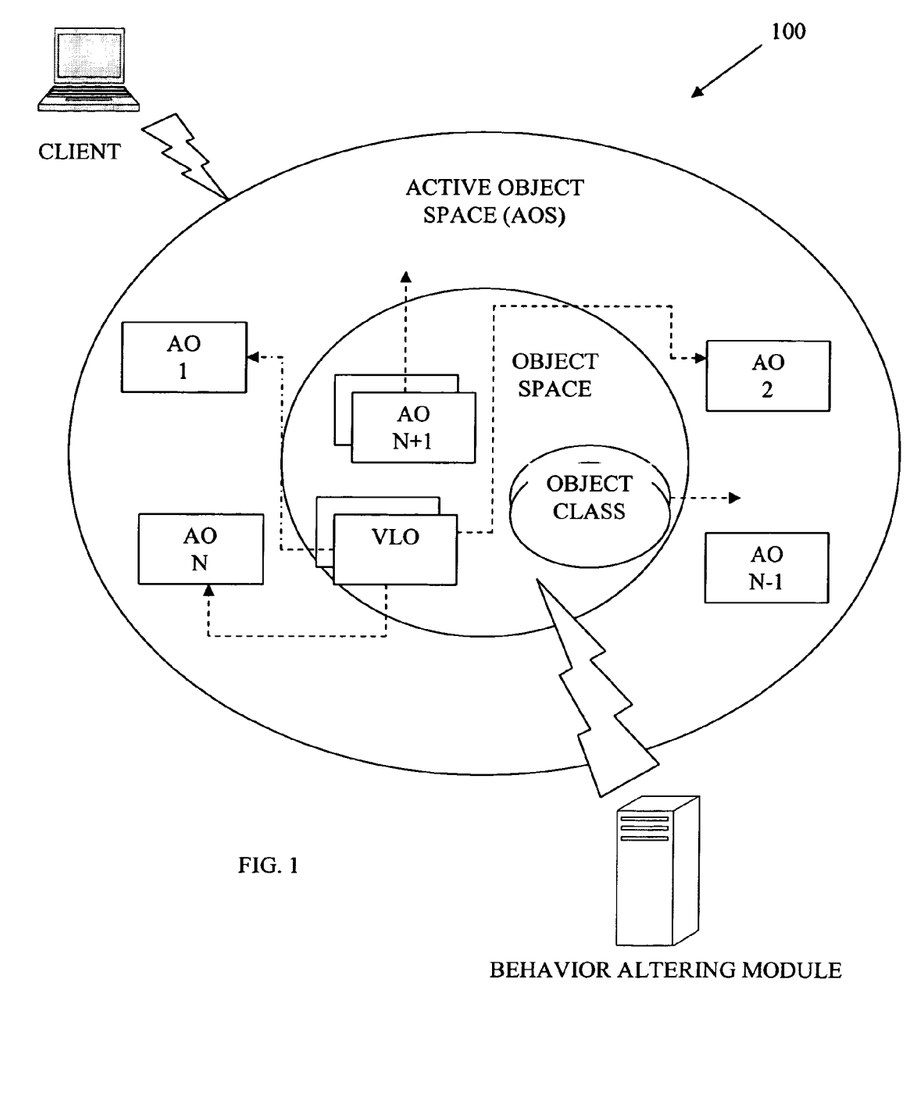
FIG. 1 is a diagram of an active object space (AOS) architectural environment or platform, according to an example embodiment of the invention.

FIG. 1 is a diagram of an active object space (AOS) architectural environment or platform 100, according to an example embodiment of the invention. The components are implemented within a machine-accessible or computer-readable medium and are accessible over a network. The network may be wired, wireless, or a combination of wired and wireless. In an embodiment, the components are implemented as a web application server and represent a web content-delivery system.

The architecture 100 may be viewed as an extension to regular object spaces, such as Sun Microsystems JavaSpaces®. The architecture 100 includes the notion of an active object (AO). An AO comes with its own behavior (e.g., code) and can be given its own thread of control for executing its behavior. In an embodiment, an AOS may be viewed as a server or machine which can be used both as an execution space for AO's and as a coordination place where the AO's communicate in an indirect and decoupled manner retrieving objects from a globally shared object store.

A novel feature of the AOS presented herein is its ability to dynamically upload and/or remove behaviors at run time. This will be more fully described in the example descriptions that follow. Moreover, embodiments presented herein use AO's to implement the basic building blocks of a server's architecture and relies on the AOS for coordinating activities of different AO's. Therefore, instead of a hardwired architecture, the architecture 100 presented herein is dynamic, loosely coupled, and malleable, since it is based on sets of AO's and their relationships to one another, which may be dynamically altered.

In the descriptions that follow it will be demonstrated that an application or software component's behavior within a machine may be adapted or modified dynamically and without being constrained by choices or decisions which were made during a design phase for the application or component. By using architecture 100, which is based on an AOS, a component's functionality may be dynamically modified, added, or removed at run time without having to stop or reboot the machine to effectuate the change.

The components of the architecture include a server application or component, a client application (client), a state-only object (SOO), a fixed-layer object (FLO), and a variable layer object (VLO). Each of these will now be discussed in turn.

The server component is an application or program running on a machine, such as a server. The component provides functionalities to clients. One example of a component is an enterprise-wide employee directory. The component is accessible over a network, such as the Internet or an Intranet.

The client is a program that connects over the network to the component and consumes information from the server component by issuing requests to and receiving responses from the server component(s).

A SOO is a data structure that includes state information. However, the SOO data structure does not include any machine-executable behavior. In other words it is pure data, like a structure in the C programming language, a record in the Pascal programming language, an extensible markup language (XML) document, etc.

A FLO is an AO responsible for communication between external entities, the component, and any VLO that it may include. FLO's are responsible for recognizing new VLO's (which the FLO's use) on the object space, and installing these VLO's for achieving changed run-time behavior.

A VLO is a replaceable object of function that includes both behavior and possibly state. A VLO is capable of manipulating data passed directly to it via a FLO.

Within the architecture 100, a number of object classes exist in the object space. Coordination between AO's is achieved through the posting and reading of objects from the architecture 100 by the various AO's of the architecture 100. The AO's do not have to communicate directly; communication is managed by the AOS which enforces the indirect and loosely coupled communication between AO's.

Some example SOO objects include a RequestState object and a ResponseState object. Each of these will now be discussed in turn.

A RequestState object includes a variety of attributes, such as:
1) requestID—an identifier used to map a particular request or response to an open communication channel, such as a Hyper Text Transfer Protocol (HTTP) socket.
2) requestText—the actual text of a request, sent by a client (e.g., such as an HTTP client).
3) processorID—an identifier used to indicate what type of processor (typically a type of AO) should manipulate the object next. A special value of "UNASSIGNED" is used to indicate that an instance of this object has not yet began processing.
4) processorHistory—an encoding of the processors that have handled an instance of this object up to a particular point in time.

A ResponseState object includes similar attributes:
1) requestID—an identifier, inherited from a RequestState object, identifying the open communication channel (e.g., HTTP socket) the response may ultimately be returned through.
2) responseText—the actual text of the response to be delivered to a client, such as an HTTP client.
3) processorID—an identifier used to indicate what type of processor (typically a type of AO) should manipulate the object next. A special value "DONE" is used to indicate that no further work is required on the response, and the response may be transmitted to its client.
4) processorHistory—an encoding of the processors that have handled this object and its matching RequestState object to date.

The architecture 100 also includes a server component referred to as a "Transponder." The Transponder is an AO responsible for receiving requests, such as HTTP requests, and posting them to the object space (as RequestState SOO's). Once the Transponder has received the request, it creates a RequestState object, setting the requestText attribute to include the request text. It also creates and assigns a unique requestID that it maps against the communication channel (e.g., HTTP socket) to indicate where the request came from, and marks the RequestState object with this identifier. The processorID defaults to "UNASSIGNED." Once the RequestState object is created, it is delivered to the AOS.

The Transponder is also responsible for picking up responses (as ResponseState SOO's) ready for delivery from the object space and returning them to their respective requesting clients. It registers for notification with the AOS, requesting that it be notified of ResponseState objects with a processorID equal to "DONE." Upon notification, the Transponder will take the matching ResponseState object from the object space and deliver the contents of responseText to the appropriate client via the communication channel (socket) identified by the requestID attribute.

Furthermore, the Transponder is also configured to watch for, and install two types of VLO's. These objects are labeled Pre-Request Behavior and Post-Request Behavior. They can be used to add/alter behavior that does processing immediately before a request is delivered to the object space or directly after a response has been posted to the object space. For both these VLO's, the Transponder registers for notification with the AOS, asking that it be informed whenever objects of class Pre-Request Behavior or Post-Response Behavior are placed in the object space. Upon notification, the Transponder takes these objects and installs them for use internally.

Another component of the architecture 100 is a Processor Selector. This is an AO that watches the object space by registering for notification to the space, asking to be informed for all RequestState objects with a processorID of "UNASSIGNED." Upon receipt of notification, this AO takes a matching RequestState object, interrogates the communication header (e.g., HTTP header) of the object's requestText field and returns it to the AOS with a new processorID value that identifies the type of processor that should next process this request. The Processor Selector includes a VLO (called a Process Mapper) that does the actual interrogation and decision making.

In an embodiment, there are a few special components, such as a /"ping" processor and a "/helloWorld" processor. These are example HTTP Uniform Resource Identifiers (URI) processing AO's that know how to process HTTP requests that end in "/ping" and "/helloWorld." These AO's register for notification with the object space for RequestState objects matching the processorID's that they have been assigned. However, they delegate the actual response text generation to their respective VLO's.

For the "/ping" and "/helloWorld" processors, the RequestState object is consumed by these processors and a ResponseState object including the required response text (in the responseText attribute) is generated and placed on the object space in place of the RequestState object. The processorID of the RequestState object which ends its life is assigned to the new ResponseState object to allow the response to return down the same communication channel or socket as the initial request did. When no more processing is needed for a request, these processors assign the processorID to the special value of "DONE" to indicate that the response is ready for delivery to the client.

In an enhanced embodiment, a "400: Bad Request" and a "404: Not Found" processors could also be provided. These example HTTP management processors generate HTTP management responses to clients. To illustrate, the "400: Bad Request" processor watches the object space for any requests that are deemed badly formed, either by the Processor Selector, or specific URI Processor AO's. It does so by registering for notification with the object space, asking to be notified of any RequestState or ResponseState objects whose processorID is a reserved "BAD_REQUEST" value.

Upon notification of a bad request, the AO takes the matching object from the object space and generates an appropriately formatted HTTP "400: Bad Request" ResponseState object to return to the offending client. The ResponseState requestID is inherited from the bad RequestState object, some boiler-plate or configurable text is assigned to the responseText attribute describing the problem, and the processorID is assigned "DONE" to indicate that this response is ready for delivery.

The architecture 100 supports dynamic and real-time extension. To illustrate this functionality an example is now presented. Consider a client that interacts with the architecture 100 for purposes of receiving a web content-delivery service, whose interface is supported by a first component within the AOS, such as AO #1. AO #1 may interact with a variety of other AO's to supply the client with web content delivery.

Now consider that a behavior altering module is introduced into the AOS for purposes of enhancing, in some manner, the web content-delivery service. The behavior altering module may monitor the performance time associated with content delivery of the AO #1 and add new components (AO's) to the AOS based on unacceptable response times delivered to the client or may swap out VLO's of key AO's with a newer version based on an unacceptable client response times.

One way to achieve this within the architecture 100, is for the behavior altering module to install itself (as a new AO) within the AOS and to register for notification with the AOS asking to be informed of any ResponseTime objects passed to the object space.

The ResponseTime object may be a new object introduced into the object space that includes the following attributes:
1) processorHistory—an encoding of the processors that have handled the response for this object.
2) responseTime—the actual recorded time between receiving the request, and delivering the response for a particular HTTP request.

Consider that the behavior altering module delivers a "Ping Factory" AO to the AOS and as indicated above the Ping Factory requests that the AOS notify it for all ResponseTime objects posted to the AOS. Once this is done, the Ping Factory delivers to the object space a new VLO (enhancement) that was bundled with the Ping Factory. This new VLO knows how to generate the new ResponseTime objects as a Post-Response Behavior object.

When the new VLO is delivered to the object space, the Transponder is notified by the object space, since the new VLO is identified as a Post-Response Behavior object. The transponder takes this new VLO from the object space and installs it internally. From this point on for each ResponseState object that is assigned the special value of "DONE" for its processorID attribute, the Transponder will use the new VLO to generate a new instance of a ResponseTime object and post it to the object space. The processorHistory attribute value included within the ResponseState object is copied over to the processorHistory attribute of the ResponseTime object instance.

Next, the Ping Factory begins to dynamically detect the new ResponseTime objects being posted in the object space. The Ping Factory may use threshold values to decide that the response times for clients requesting ping content are unacceptable. It should be noted that the response times may be unacceptably low or may be unacceptably high, since there may be a desire to have a level amount of responsiveness from the AO #1 component. The Ping Factory may inspect the situation by interrogating the processorHistory attribute looking for the "/ping" URI processorID in the history to shortlist the "/ping" requests and compare the responseTime attribute against certain predefined limits or thresholds.

When the Ping Factory decides to alter how the "/ping" Processor AO does its work, the Ping Factory delivers new Ping Behavior via a VLO to the object space. The object space notifies the "/ping" Processor AO of this new Ping Behavior. The "/ping" Processor AO takes this new behavior from the object space and installs it internally. This in turn, changes the effort required to generate ping responses, and has a strong influence on response times experienced by the clients.

In the example presented above the "/ping" Processor may be viewed as an AO component, such that the Ping Factory and its new object (ResponseTime) are dynamically installed within the AOS using a VLO as a Post-Response Behavior object (enhancement). This integrates the Ping Factory with the response times associated with the "/ping" Processor, and permits the Ping Factory to make a dynamic and real-time determination as to whether to alter the "/ping" processor behavior when responsiveness to clients is deemed unacceptably low or unacceptably high.

It has been demonstrated that the AOS architecture 100 may be enhanced to include Pre-Request Behavior objects and Post-Response Behavior objects that are monitored by a Transponder. These types of objects are VLO's that can be integrated into the AOS for purposes of dynamically altering or adapting the behavior of AO's (components) at run time.

Figure 2:
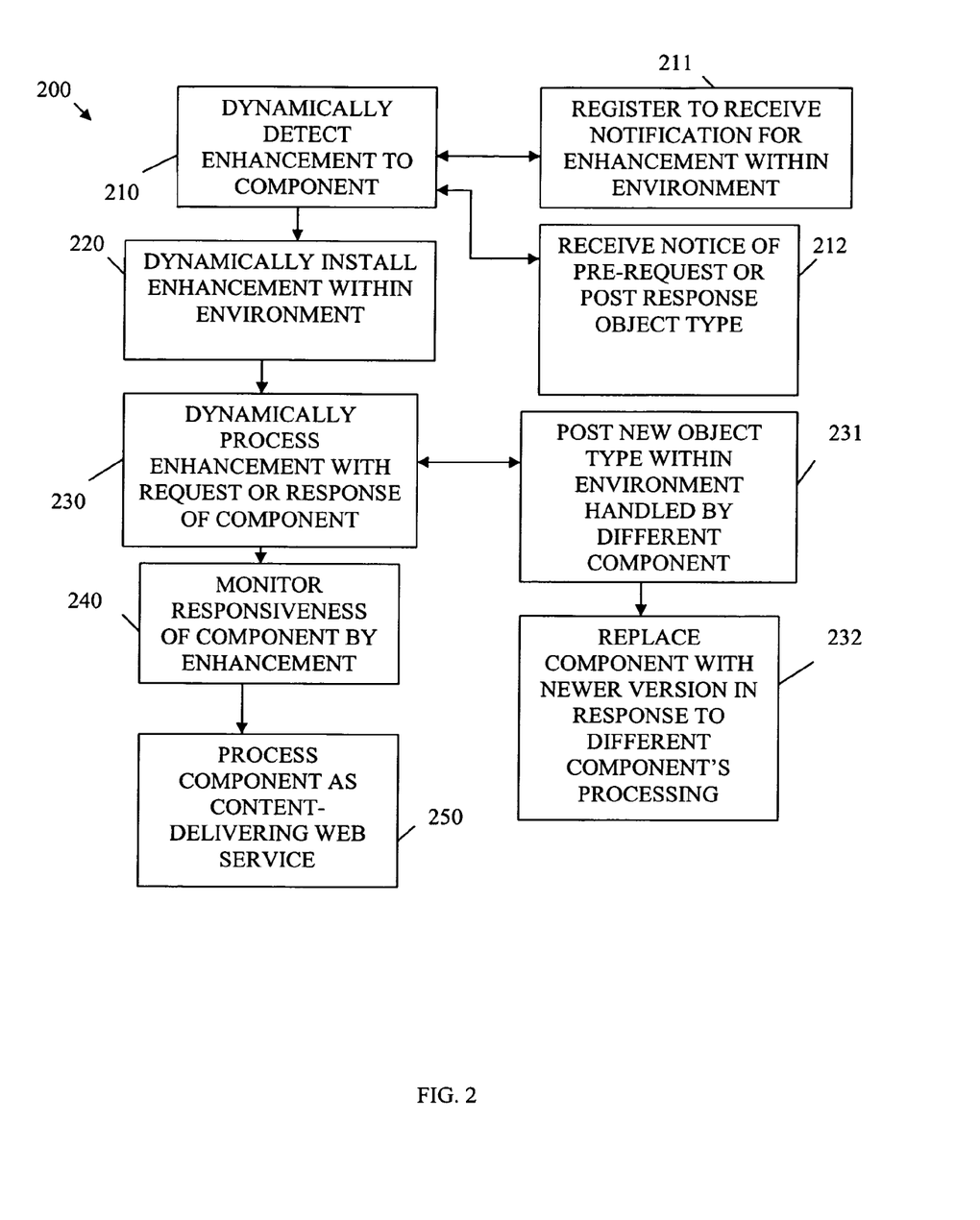
FIG. 2 is a diagram of a method for dynamically adapting a component, according to an example embodiment of the invention.

FIG. 2 is a flowchart of a method 200 for dynamically adapting a software component, according to an example embodiment of the invention. The method 200 (hereinafter "adapting component," or "adapting AO") is implemented in a machine-accessible and readable medium and is operational over a network. The network may be wired, wireless, or a combination of wired and wireless. In an embodiment, the adapting component is implemented within an AOS architecture, environment, or platform; such as the architecture 100 of FIG. 1.

At 210, the adapting component dynamically detects an enhancement to another component within a processing environment. The enhancement may be viewed as combination of a new AO, a VLO to replace behavior in the transponder and a brand new class to describe the new ResponseTime SOO. The environment is an AOS where the architecture is defined by the loosely coupled relationship and interactions between AO's. In this manner, the adapting component and its processing depicted in FIG. 1 may also be viewed as one or more AO's executing within the processing environment.

The adapting component may detect and distinguish an enhancement to an existing component in a variety of manners. For example, at 211, the adapting component may have previously registered with the environment to receive active notifications for any enhancement posted within the environment.

One technique for doing this is for enhancements to be defined as a specific type of VLO, such as a Pre-Request Behavior object or a Post-Response Behavior object. The adapting component AO requests that the environment notify it when objects with these characteristics are posted to the environment. In this manner, at 212, the adapting component may dynamically and in real time receive notice of Pre-Request Behavior and Post-Response Behavior objects, and these objects, posted within the environment, indicate that an enhancement is being delivered to the environment.

At 220, once the adapting component receives notice of the enhancement and detects its presence into the environment, the adapting component dynamically installs the enhancement within the environment. One technique for doing this may be to reference the executable instructions of the enhancement internally within the processing of the adapting AO. This can occur when the enhancement is written in a programming language that supports late binding of code, such as JAVA, etc.

For example, if the enhancement is identified as a Pre-Request Behavior object type, then the adapting AO may execute or call the enhancement instructions before it generates RequestState objects (discussed above with respect to FIG. 1). Alternatively, if the enhancement is a Post-Response Behavior object type, then the adapting AO may execute or invoke the enhancement after it generates a ResponseState object (also discussed above with respect to FIG. 1).

Therefore, the adapting AO may properly load and install the enhancement within the environment based on the type of enhancement identified or detected. Moreover, loading and installation may be achieved by properly referencing the enhancement within the adapting component to occur on a proper event or condition, such as before generating a RequestState object or after generating a ResponseState object.

Once the enhancement is dynamically loaded and installed within the environment, at 230, the enhancement may be dynamically processed within the environment for requests or responses associated with the component. When the enhancement is loaded or installed within the environment, its execution sequence or timing of execution is known to the adapting AO. Thus, when a condition or event dictates, the adapting AO initiates or executes the enhancement. It should be pointed out that the installation and execution of the enhancement occurs in a dynamic and real-time fashion within the environment.

In an embodiment, once the enhancement is executed, the output associated with that execution may generate a new object within the environment that was not previously known to the environment. This new object may be handled by another component (AO) which was dynamically installed within the environment. The adapting AO may not even be aware of the new or different AO, all the adapting AO knows is that a new object is generated and posted to the environment when the enhancement is executed. The new AO then dynamically detects the new object and performs some processing.

In some cases, at 232, the new AO may actually determine that a different behavior for an existing AO should be installed within the environment in response to processing the new objects associated with the enhancement. Thus, determinations may be dynamically made and made in real time through the use of enhancements to decide whether a particular existing component is performing up to par and to decide whether its behavior (VLO) should be replaced, modified, or upgraded based on processing of the new AO that consumes the output of the enhancement. An example of such a situation was presented above with respect to FIG. 1 for new ResponseTime objects processed by the Ping Factory (the new AO) which, in turn, generates a new VLO (enhancement) for the "/ping" Processor AO as needed.

In an embodiment, at 240, the adapting AO may use the enhancement to monitor the responsiveness of the original AO. In some cases, at 250, the original AO may be associated with a content-delivering web service. It is understood, that the enhancement and component may be any application that may be installed and processed within the environment. The content-delivering service is presented as one example component. Furthermore, the embodiments of the invention are not intended to be limited to any particular type of component or enhancement.

The adapting AO demonstrates a technique for dynamically adapting a software component at run time in an automated fashion. This is achieved by recognizing enhancements, installing enhancements, and processing enhancements within the environment. Consequently, the throughput of applications or components may now be altered or adapted though the use of dynamic enhancements delivered to the running environment; rather than though the use of additional physical resources, such as machines and/or memory.

Figure 3:
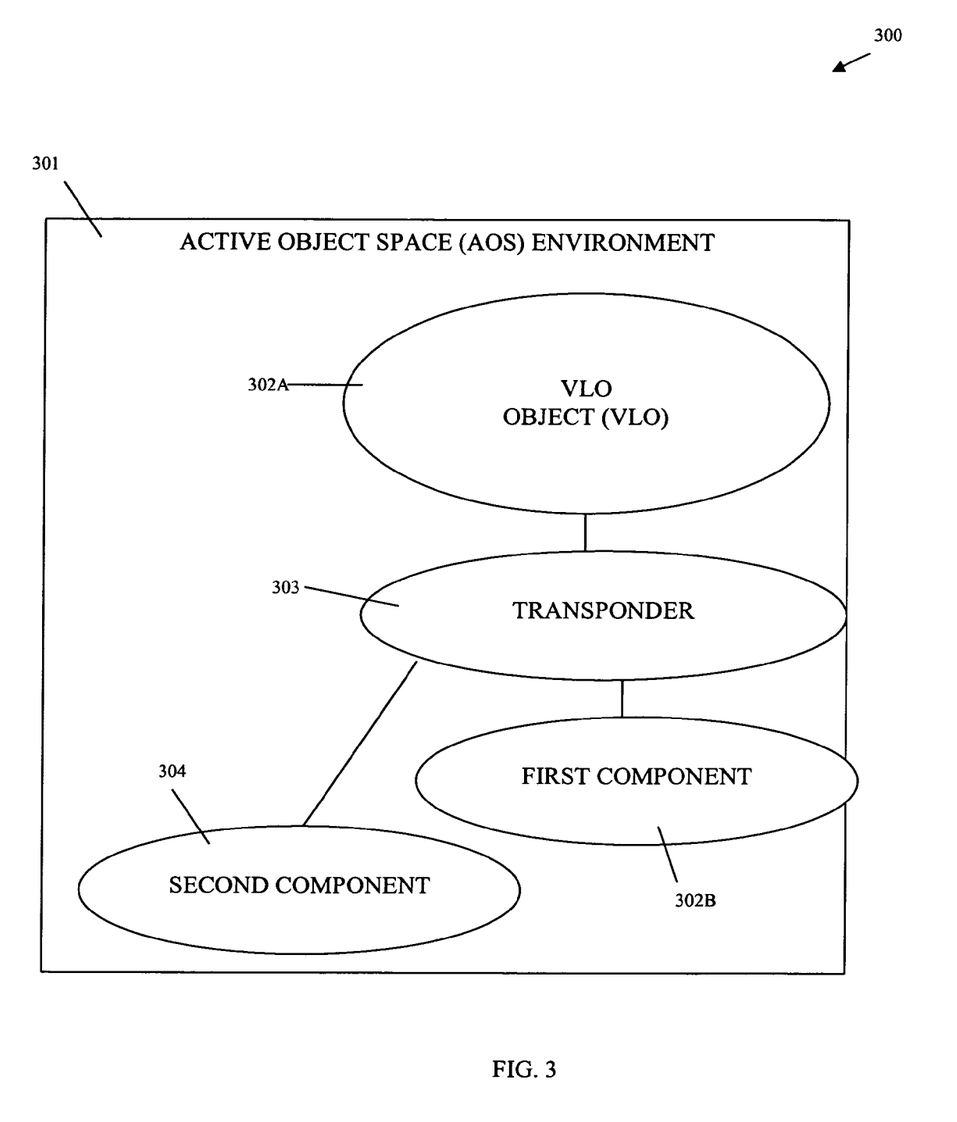
FIG. 3 is a diagram of dynamic adaptive system, according to an example embodiment.

FIG. 3 is a diagram of a dynamic adaptive system 300, according to an example embodiment. The dynamic adaptive system 300 is implemented in a machine-accessible and computer-readable medium and is operational over a network. The network may be wired, wireless, or a combination of wired and wireless. In an embodiment, the dynamic adaptive system 300 is implemented within the architecture 100 of FIG. 1 and at least partially implements the method 200 of FIG. 2.

The dynamic adaptive system 300 includes an active object space environment (AOS) 301, a variable layer object (VLO) 302A, and a transponder 303. In some arrangements, the dynamic adaptive system 300 also includes a first component 302B and a second component 304.

The AOS 301 supports a dynamic processing environment that is defined by coordination and cooperation of active objects (AO's) implemented within the AOS 301. Processing occurs by posting SOO's, which are consumed, detected, and processed by other AO's.

The VLO 302A is a special type of VLO that includes instructions and can execute within its own thread of control supplied by some containing AO. The VLO 302A of the dynamic adaptive system 300 is designed to be an enhancement to or a dynamic compliment to a first component or some other AO 302B that processes within the AOS 301. The VLO 302A is identified by a type to the AOS 301. The type may be associated with a Pre-Request Behavior object or a Post-Response Behavior object for the AO 303.

The Transponder 303 is an AO that causes RequestState objects to be posted within the AOS 301. The Transponder 303 also consumes ResponseState objects posted to the AOS 301. The VLO 302A may integrate with this processing by acquiring information known to the transponder 303 about RequestState objects before the RequestState objects are posted to the AOS 301 (Pre-Request Behavior object type of VLO 302A). Alternatively, the VLO 302A may integrate with the processing by acquiring information known to the transponder 303 after ResponseState objects are posted to the AOS 301 (Post-Response Behavior object type of VLO 302A).

The transponder 303 determines based on the VLO 302A object type how to install the VLO 302A within the AOS 301. Moreover, the transponder 303 determines when to process the VLO 302A. Installation and execution of the VLO 302A occurs within the AOS 301 in a dynamic and real-time fashion. This means no manual integration, configuration, and/or compilation is needed to install and execute the VLO 302A.

In an embodiment, the dynamic adaptive system 300 also includes a second component or AO 304 that is dynamically installed and processed within the AOS 301. The second AO 304 may include the instructions to initially post the VLO 302A within the AOS 301. The AOS 301 notifies the transponder 303 when the VLO 302A is detected. The transponder 303 then loads and installs the VLO 302A within the AOS 301 or internally to the transponder 303 based on the object type associated with the VLO 302A (Pre-Request Behavior or Post-Response Behavior).

The second AO 304 may also register with the AOS 301 for receiving a new type of object. The new type of object is produced by the VLO 302A. The new type of object may be retrieved from the AOS 301 when posted by the VLO 302A and evaluated. In some cases, the second AO 304 may determine based on the evaluation of instances of the new objects being posted to the AOS 301 that a different VLO for the first AO 302B should be used, which the AO 304 places on the object space. The AO 302B will replace its VLO with the new VLO posted by AO 304, which is designed to account for deficiencies that the second AO 304 detected by evaluating the instances of the new objects that were posted by the VLO 302A.

An example scenario of such a situation was presented above with respect to FIG. 1, where the new object was a ResponseTime object and the second AO 304 was a Ping Factory. Thus, the VLO 302A may be viewed as an enhancement that can be configured to dynamically track response times for client requests, where the response times are associated with web content-delivery supplied by the first AO 302B and where determinations to alter the behavior of the first AO 302B is achieved by the second AO 304 though evaluating information being posted to the AOS 301 by the VLO 302A.

The transponder 303 facilitates communication between the AOS 301 and external clients to the AOS 301. The VLO 302A is a special type of AO that is recognized by the transponder 303. In some cases, the object type of the VLO 302A informs the transponder 303 to install, load, and process the VLO 302A within the transponder's 303 logic. This permits other components (such as the second component 304) to be installed and used to evaluate a first component 302B. Evaluation occurs through new objects that the VLO 302A produces when it executes. Those new objects include information about the first component 302B and its processing within the AOS 301. The second AO 304 may then dynamically supply replacement behavior for the first AO 302B to achieve a better level of service.

It has now been demonstrated how a component or AO may be dynamically adapted though software mechanisms; rather than through additional hardware mechanisms.

Figure 4:
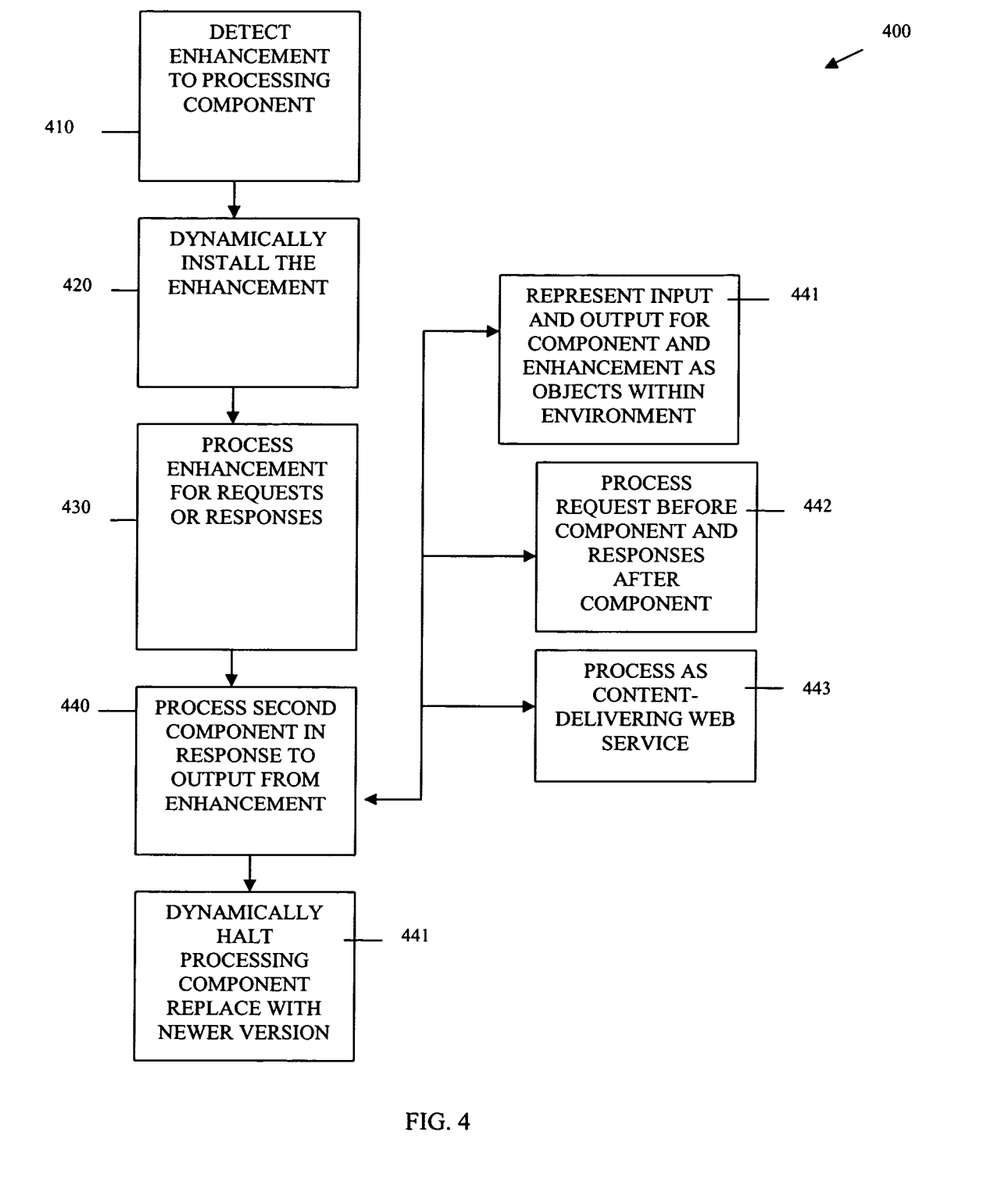
FIG. 4 is a diagram of another method for dynamically adapting a component, according to an example embodiment.

FIG. 4 is a diagram of another method 400 for dynamically adapting a software component or AO, according to an example embodiment. The method 400 (hereinafter "adaptation instructions") is implemented in a machine-accessible and computer readable medium and is operational over a network. The network may be wired, wireless, or a combination of wired and wireless. In an embodiment, the adaptation instructions are an alternative processing technique to the technique presented above with respect to the method 200 of FIG. 2.

The adaptation instructions may be uploaded to a machine from removable machine media for processing when the removable media is interfaced to the machine. Alternatively, the adaptation instructions may be downloaded from a remote server over the network and installed on a machine for processing. In still other arrangements, the adaptation instructions may be pre-fabricated or loaded within the memory and/or storage of a machine and processed on the machine. The adaptation instructions when executed perform the method 400 depicted in FIG. 4.

At 410, the adaptation instructions detect an enhancement associated with a processing AO. In an embodiment, the enhancement is a VLO that is posted to an AOS, and the adaptation instructions are a transponder component that allows communication between the AOS and external client applications.

At 420, the adaptation instructions dynamically install the enhancement for subsequent execution within the environment. In an embodiment, the adaptation instructions dynamically install the enhancement internal to the processing of the adaptation instructions. This can be achieved with a pointer to the enhancement instructions for execution upon a detected event or sequence. The sequence may be determined based on the characteristics of the enhancement (e.g., pre-process behavior or post-process behavior).

Accordingly, at 430, when the proper sequence of events is detected the adaptation instructions processes the enhancement for requests or responses. In other words the enhancement is a pre-process component when it is identified as a Pre-Request Behavior type of object and the enhancement is a post-process component when it is identified as a Post-Response Behavior type of object.

In an embodiment, at 440, a second AO may be processed in response to output produced from the enhancement. For example, at 441, input and output within the environment of the adaptation instructions may be represented as objects having defined types. In this manner, the second AO may detect newly created objects generated by the enhancement.

Again, at 442, the enhancement may process before the adaptation instructions generate requests or the enhancement may be process after the adaptation instructions generate responses to those requests. In an embodiment, the first AO may be processed as a content-delivering web service and the second AO uses the enhancement to determine if the first AO is being responsive enough to satisfy certain predefined thresholds. Assuming responsiveness is not acceptable, the second AO delivers replacement behavior to the first AO, designed to address specific responsiveness bottleneck issues.

To do this, at 441, the second AO may send the adaptation instructions or the first AO a message. The message or command indicates that the first AO should halt processing and remove itself from the environment. An updated version of the first AO may then be dynamically installed and processed within the environment.

It has now been demonstrated how server software components or AO's may be adapted dynamically and at run time. This permits enhancements to facilitate improved processing of AO's without the need to bring down machines or reboot machines that process the AO's. Moreover, this permits software mechanisms to be deployed to address performance issues with AO's; rather than using conventional hardware resources (additional machines and/or memory).

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A computer-implemented method, including:
dynamically and in real-time detecting an enhancement to a component within a processing environment, wherein the enhancement is executable instructions that alter the behavior of the component and the component is also a software application that executes within the processing environment, wherein the component is identified as an active object;
dynamically and in real-time installing the enhancement and its instructions within the processing environment in response to a type of the enhancement detected; and
dynamically and in real-time processing the enhancement via its instructions for at least one of a request for and a response from the component, and wherein when the enhancement is processed in response to the request, the enhancement is processed either before the request is handled or after the request is handled by the processing component, wherein an adapting component is responsible for dynamically and in real-time installing and executing the component and the enhancement, and the adapting component dynamically and in real-time installs and references the enhancement to force the enhancement to install and process either before the component is processed or after the component is processed.

2. The method of claim 1 further including, registering with the environment for receiving a notification on the enhancement once the enhancement is available within the processing environment.

3. The method of claim 1, wherein dynamically detecting further includes receiving notification from the environment that a pre-request or post-response object type was posted in the processing environment.

4. The method of claim 1, wherein dynamically processing further includes posting a new object type within the processing environment, wherein the new object type is recognized and processed by a different dynamically installed component within the environment.

5. The method of claim 4, further including dynamically replacing the component within the environment with a new version of the component in response to conditions or decisions detected by the different dynamically installed component.

6. The method of claim 1, wherein dynamically processing further includes monitoring responsiveness associated with the component by the enhancement when processed.

7. The method of claim 6, further including processing the component as a content delivering web service within the environment, and wherein the environment is an active object space server platform.

8. A computer-implemented system, including:
an active object space environment (AOS) implemented in a computer-readable storage medium of a computer;
a variable-layer object (VLO) implemented in a computer-readable storage medium of the computer and adapted to dynamically enhance a first component processing within the AOS as software, wherein the VLO is an enhancement to the first component, the VLO is instructions which execute on the computer as a software program and within its own thread of control; and
a transponder implemented in a computer-readable storage medium and adapted to recognize the VLO, install the VLO in response to a type associated with the VLO, and process the VLO via its instructions within the AOS in an automated, dynamic, and real-time fashion on the computer, wherein the transponder dynamically and in real-time installs and executes the VLO by referencing the VLO before or after calls are made to the first component while the first component executes within the AOS.

9. The system of claim 8 further including, a second component that detects and processes output from the VLO within the AOS, and wherein the second component is adapted to cause a newer version of the first component to be dynamically installed and processed within the AOS in response to conditions associated with the output from the VLO.

10. The system of claim 9, wherein the output is a new dynamic object produced by the VLO.

11. The system of claim 8, wherein the transponder processes the VLO as at least one of a pre-request component and a post-response component.

12. The system of claim 8, wherein the first component is a web content-delivery service accessed by a client over the Internet.

13. The system of claim 12, wherein the VLO dynamically tracks response times for client requests from the first component.

14. The system of claim 8, wherein the AOS includes request state objects directed from clients to the first component and response state objects produced from the first component and directed to the clients, and wherein the transponder detects and communicates the request and response state objects on behalf of the clients and the first component.

15. A non-transitory computer-readable storage medium encoded with instructions thereon, the instructions when processed by a machine perform the method of:
detecting in a real time and automated fashion, on the computer-readable storage medium, an enhancement to a processing component, wherein the processing component is an active object, which is comprised of software instructions that process on a computer, and wherein the enhancement is also software instructions that process on the computer;
dynamically installing, on the computer-readable storage medium, the enhancement in real time in response to a type for the enhancement, wherein the enhancement is executable instructions that process on a computer from the computer-readable storage medium; and
processing, on the computer-readable storage medium, the enhancement, via its instructions, in real time for requests to or responses generated from the processing component, and wherein when the enhancement is processed in response to the requests directed to or from the processing component, the enhancement is processed before the requests are handled or after the requests are handled, wherein an adapting component is responsible for dynamically and in real-time installing and executing the processing component and the enhancement, and the adapting component dynamically and in real-time installs and references the enhancement to force the enhancement to install and process either before the processing component is processed or after the processing component is processed.

16. The medium of claim 15 further including instructions for processing a second component in response to output from the enhancement.

17. The medium of claim 16 further including instructions for dynamically installing and processing a new version of the processing component in response to instructions received from the second component.

18. The medium of claim 15 further including instructions for representing input and output associated with the processing component and the enhancement as objects within an active object space (AOS) platform.

19. The medium of claim 15 further including instructions for processing the component as a content-delivering web service that interacts with clients over the Internet, and wherein the enhancement monitors performance of the web service and is enabled to dynamically replace key web service components with new components.

* * * * *